United States Patent
Bellasalma

(12) 
(10) Patent No.: US 6,517,017 B1
(45) Date of Patent: Feb. 11, 2003

(54) END MILL FIBER CHOPPER

(75) Inventor: Jay Bellasalma, Yorba Linda, CA (US)

(73) Assignee: Masco Corporation, Taylor, MI (US)

( * ) Notice: Subject to any disclaimer, the term of this patent is extended or adjusted under 35 U.S.C. 154(b) by 0 day.

(21) Appl. No.: 09/923,465

(22) Filed: Aug. 7, 2001

(51) Int. Cl.[7] .............................................. B02C 19/12
(52) U.S. Cl. ....................... 241/30; 241/140; 241/260.1
(58) Field of Search .......................... 241/189.1, 186.1, 241/277, 280, 18, 28, 30, 140, 142, 260.1, 134, 147

(56) References Cited

U.S. PATENT DOCUMENTS

| | | | |
|---|---|---|---|
| 3,750,962 A | * | 8/1973 | Morgan, Jr. .................... 19/83 |
| 3,921,270 A | | 11/1975 | Upton |
| 4,180,906 A | | 1/1980 | May |
| 4,287,799 A | | 9/1981 | Fujita et al. |
| 4,373,650 A | | 2/1983 | Gay |
| 4,650,127 A | * | 3/1987 | Radwanski et al. .......... 241/222 |
| 5,253,815 A | * | 10/1993 | Bowns et al. ............. 241/186.1 |
| 5,271,301 A | | 12/1993 | Hiraoka et al. |
| 5,328,494 A | | 7/1994 | Kelman et al. |
| 5,383,616 A | * | 1/1995 | Svaighert ..................... 241/242 |
| 5,560,553 A | * | 10/1996 | Crane ....................... 241/186.1 |
| 5,697,560 A | | 12/1997 | Bennett |
| 5,791,587 A | | 8/1998 | Pasquale |
| 5,806,387 A | | 9/1998 | Jander |
| 5,857,370 A | | 1/1999 | Grenz et al. |
| 6,152,657 A | | 11/2000 | Packer et al. |
| 6,168,355 B1 | | 1/2001 | Wardell |

* cited by examiner

*Primary Examiner*—Mark Rosenbaum
(74) *Attorney, Agent, or Firm*—Emch, Schaffer, Schaub & Porcello Co., L.P.A.

(57) ABSTRACT

This fiber chopper overcomes the disadvantages of the previous cutting rollers for chopping continuous filaments. The apparatus includes a means for feeding continuous fibers through apertures in a fixed head. End mills engage the continuous fiber and chops them into discrete fiber lengths.

22 Claims, 5 Drawing Sheets

END MILL FIBER CHOPPER

TECHNICAL FIELD

This invention relates to an apparatus and process for chopping continuous fibers into discrete fiber lengths. More specifically, the apparatus uses an end mill to chop the discrete fiber lengths.

BACKGROUND OF THE INVENTION

Fiber choppers typically use cutting rollers to break continuous rovings into individual short fiber lengths. These choppers use a hard rubber back up roll as an anvil which cooperates with the cutting roller carrying one or more transversely extending blades. The back up roll and cutting roller cooperate to chop a discrete fiber length off the continuous roving each time a rotor blade contacts the back up roll.

These cutting rollers work well for producing chopped fibers such as conventional chopped glass fibers.

Continuous filaments include a single filament or a plurality of filaments in a strand, with the filament having continuous length or substantial length, e.g., greater than one foot. A plurality of filaments is a plurality of segments of a single filament in adjacent relationships, such as occurs when a single filament is wrapped around a bobbin tube. Formation of the filaments also normally involves treating the filaments with a size to enhance the properties of the fiberglass in subsequent operations.

Recent advances, however, in after coatings for continuous filaments make the fibers more difficult to chop. The filaments are stiff and tuff and often have rubbery coatings. Conventional cutting rollers often don't cut the stiff fibers. Results often leave the fibers bent or kinked. The typical result is not the clean cut industry desires. Further, the cutting rollers often break blades or do not penetrate the rubbery coatings.

BRIEF SUMMARY OF THE INVENTION

I have developed a process and apparatus which overcomes the disadvantages of the previous cutting rollers for chopping continuous filaments. My apparatus for chopping continuous fibers into discrete fiber lengths includes at least one fixed head having a first side, a second side with at least one aperture through the fixed head. The apparatus also includes at least one means for feeding at least one continuous fiber through the aperture from the first side of the fixed head. At least one end mill on the second side of the fixed head engages the continuous fiber and chops them into discrete fiber lengths.

Preferably, the fixed head has a plurality of apertures therethrough and a plurality of means feeding continuous fibers to the apertures. Preferably, a plurality of end mills chop the continuous fibers into chopped fibers of a shorter length.. The cutting end of the end mills may have flat cutting edges, center cutting edges or specific designs such as ball nose cutting ends with spiral grooves or flutes.

DETAILED DESCRIPTION OF THE INVENTION

The apparatus of this invention chops continuous fibers into discrete fiber lengths. The chopper comprises at least one fixed head having a first side, a second side and at least one aperture therethrough. A means feeds at least one continuous fiber through an aperture from the first side of the fixed head. An end mill on the second side of the fixed head engages the continuous fiber and chops them into discrete lengths. Preferably, the fixed head has a plurality of apertures therethrough and a plurality of means feed continuous fibers through the apertures. Preferably, the chopper also has a plurality of end mills for engaging the continuous fibers. Preferably, the fixed head has a circular shape and the end mill rotates in a circular path. Preferably, the apertures in the fixed head are a slot or circular hole. The means for feeding the continuous fiber generally is a pair of nip rollers. In general, the means for feeding the continuous fiber aligns the fiber transverse to the end mill. A hollow tube between the nip rollers and fixed head may be used to feed and align the continuous fibers.

Figure 1:
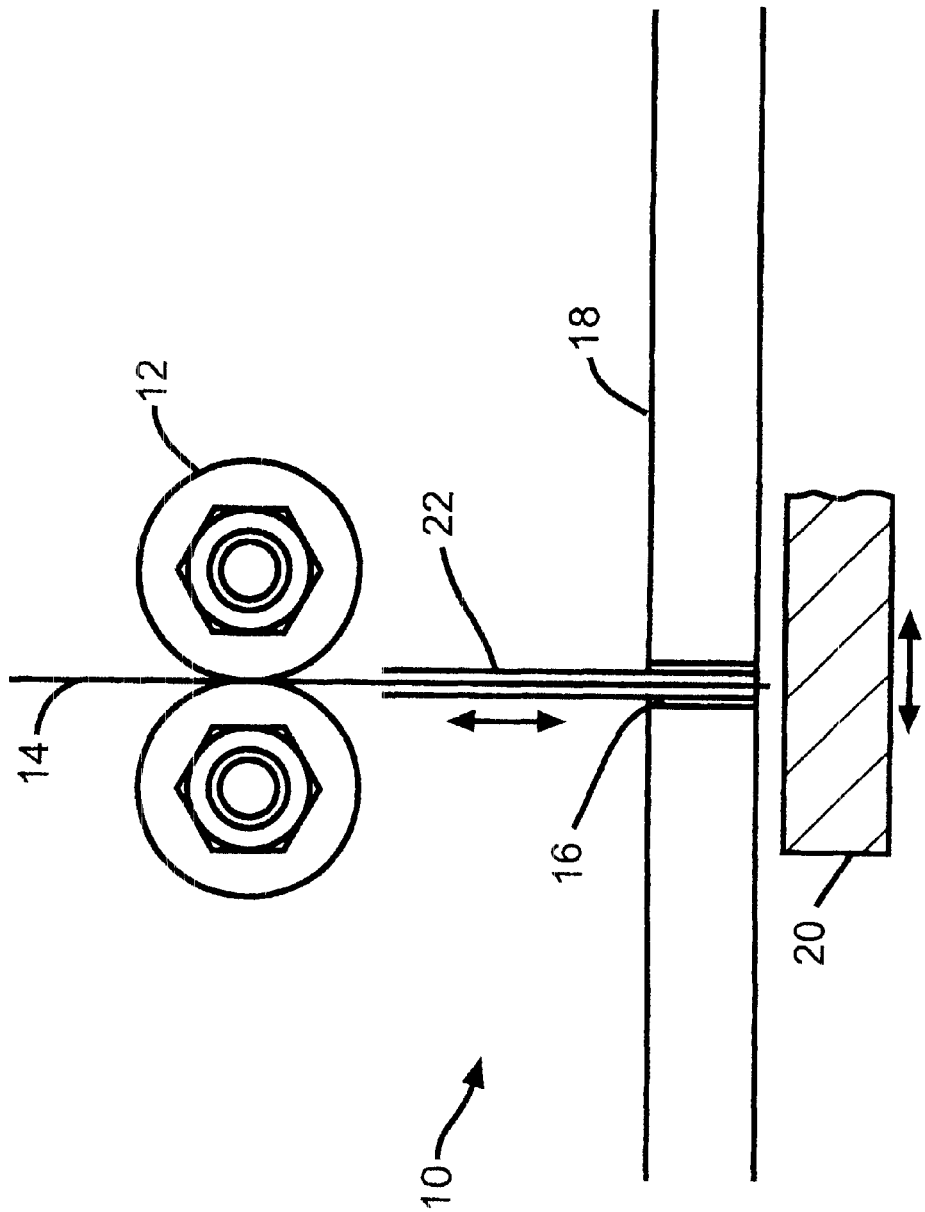
FIG. 1 is a side view of the apparatus for continuously chopping fiber strands into chopped fibers.

FIG. 1 shows chopper 10 having nip rollers 12 feeding continuous fibers 14 through apertures 16 of fixed head 18. End mill 20 engages fibers 14 and chop them into discrete fiber lengths. Tube 22 aids in feeding fibers 14 to apertures 16. Preferably, tube 22 extends into aperture 16. End mill 20 has movement in a horizontal or perpendicular direction with respect to fibers 14 as indicated by the arrows. This movement increases the cutting edge of mill 20. Tube 22 is an adjustable tube and moves in a vertical direction as indicated by the arrows. Adjustable tube 22 aids in the chopping process of fibers 14.

Tube 22 oscillates up and down and coordinates with the revolution of end mill 20. End mill 20 also revolves to prevent the cutting edge from heating up. Revolutions typically are about 60 rpm's. The tube's inside diameter usually rasnges from 1/1000 to a few 10000's of an inch.

Figure 2:
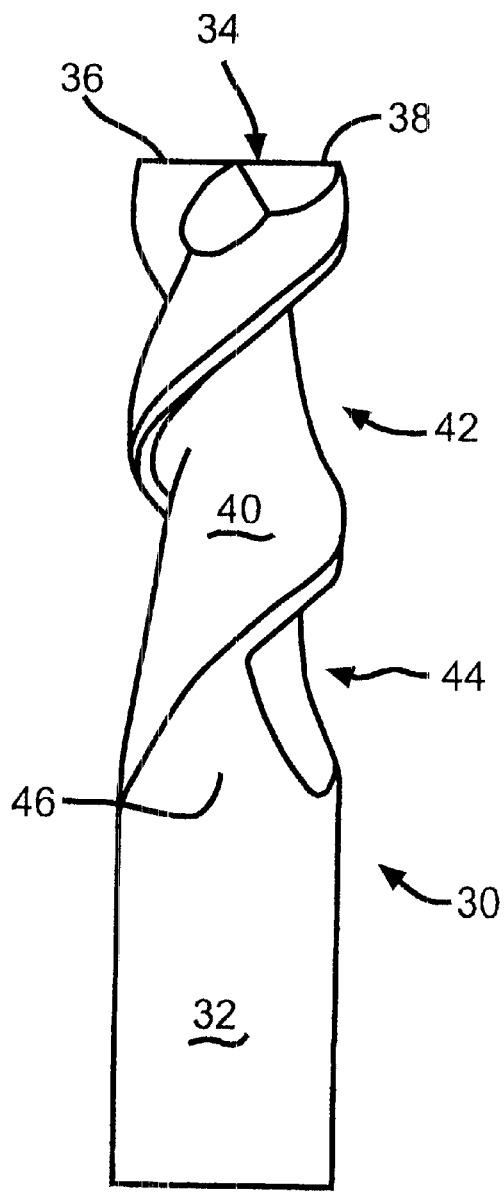
FIG. 2 is a side view of a conventional end mill.
Figure 3:
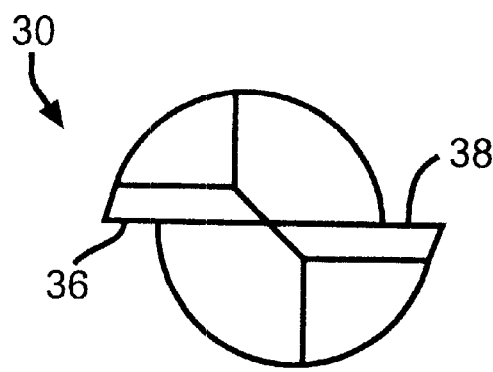
FIG. 3 is an end view of a conventional end mill.

FIGS. 2 and 3 show a conventional end mill tool with flat cutting edges. End mill 30 is made of cylindrical rod stock which has been ground to form distinctive portions. At one end of tool 30 is shank portion 32, suitable for chucking to the spindle of a milling machine (not shown) for rotating and advancing tool 30. At the other end of tool 30 is cutting end 34 which is provided with flat cutting edges 36 and 38. Between shank portion 32 and cutting end 34 is body portion 40 which is helically ground to have a number of flutes 42 and 44. A "boundary" between body portion 40 and shank portion 32 is designated 46 in the drawing.

Any of the end mills used in this invention may be made of polycrystalline diamond (CBN) or polycrystalline cubic boron nitride (PcBN) and may be manufactured using conventional methods.

Figures 4, 5:
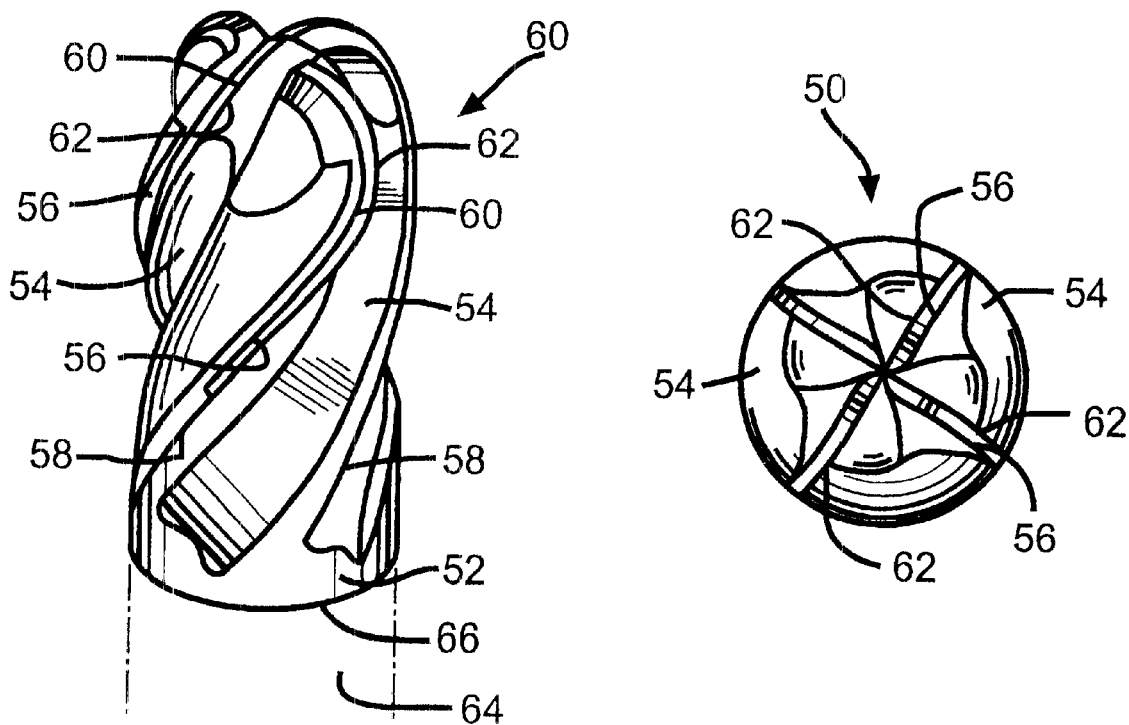
FIG. 4 is a side view of a center cutting end mill.
FIG. 5 is an end view of a center cutting end mill.

FIG. 4 shows ball nose end mill 50 using these materials. Mill 50 comprises end mill body 52 having four helical flutes 54 circumferentially and equidistantly spaced around body 52. Body 52 of ball nose end mill 50 may be fabricated from a hard and tough material such as cemented tungsten carbide. The term "diamond" is used herein interchangeably to denote polycrystalline diamond, polycrystalline cubic boron nitride, or both. Groove 56 is formed in leading edge 58 adjacent flutes 54. A sintered polycrystalline diamond or PcBN 60 is formed in situ in the helically formed groove 58. Cutting edges 62 are ground into the sintered diamond material 60 in grooves 58 in end mill body 52. Tungsten carbide end mill body 52 may then be metallurgically bonded to a steel or carbide shank 64 along juncture 66. The metallurgical bond may, for example, be a braze.

FIG. 5 shows end 68 of ball nose end mill 50 and further illustrates grooves 58 adjacent leading edge 58 of flutes 54. Polycrystalline diamond or polycrystalline cubic boron nitride 60 is compacted and sintered within the grooves 58. Flutes 54 and cutting edge 62 are ground into the PCD or PcBN material after the sintering process is complete. The PCD or PcBN cutting edge can be formed by methods which include grinding, wire electrical discharge cutting (wire EDM), and electrical discharge grinding (EDG).

Figures 6, 7:
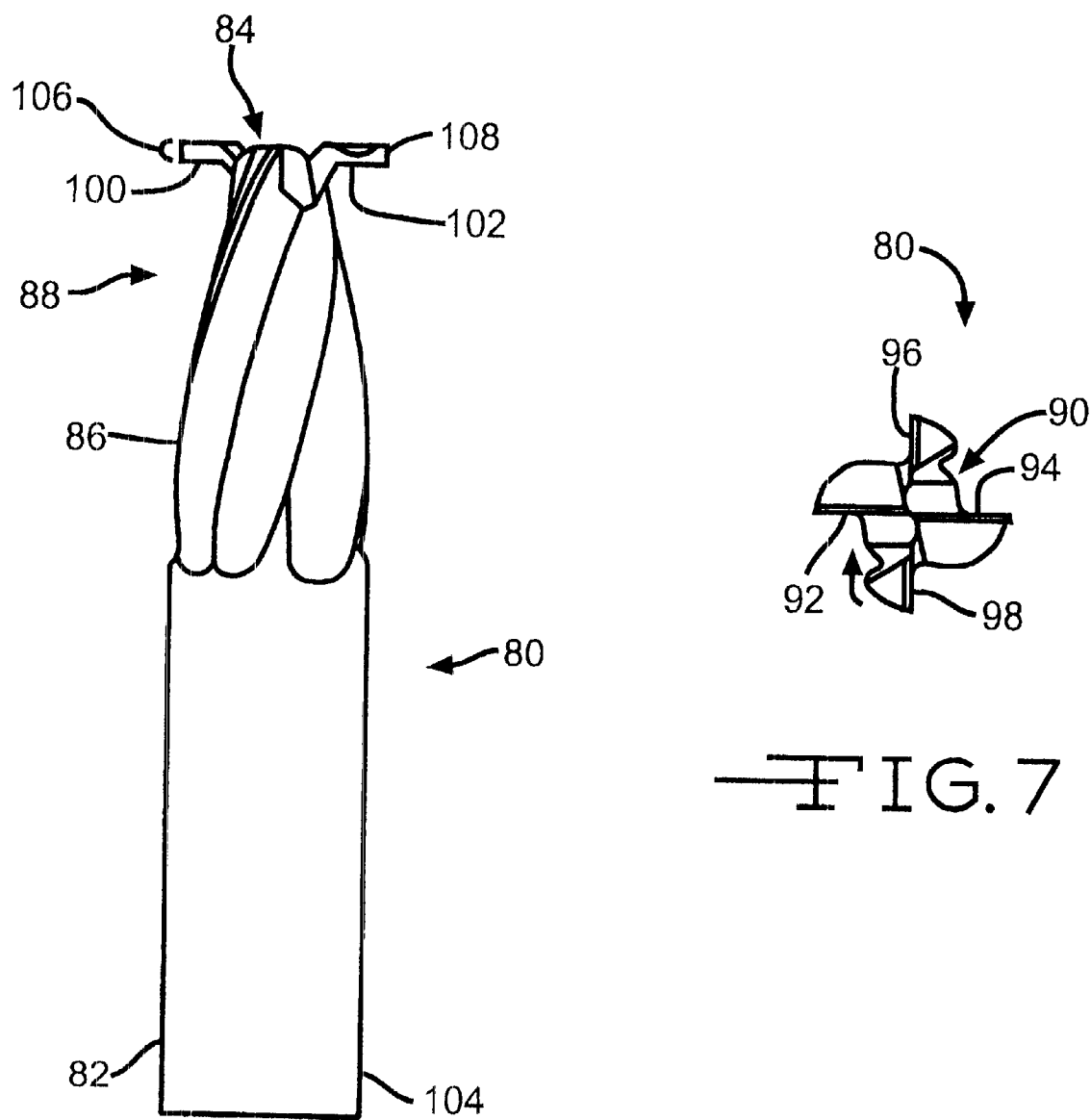
FIG. 6 is a side view of an end mill with multiple cutting edges.
FIG. 7 is an end view of an end mill with multiple cutting edges.

FIGS. 6 and 7 show end mill 80 having multiple cutting edges. FIGS. 6 and 7 show end mill 80 including shank portion 82, point 84 and body portion 86. End mill 80 has two flutes 88 and 90 extending from point 84 towards shank portion 82.

First flute 88 and second flute 90 are formed at a helix angle extending the length of body 86 of end mill 80. At point 84, flutes 88 and 90 terminate and define a pair of flat cutting edges 92 and 94, commonly referred to as end teeth cutting edges.

End mill 80 has two additional end teeth cutting edges 96 and 98 which extend from two ears 100 and 102 at an angle 90E from the body 86. Cutting edges 96 and 98 are formed without a first or second flute as provided with cutting edges 92 and 94. It will be appreciated by those skilled in the art that the specific number of additional cutting edges 96 and 98 are largely a matter of design choice and subject to variation. Additional cutting edges originate from grinding off two flutes (not shown) of a four flute tool and leaving the end teeth or cutting edges. Cutting edges 96, 98 extend to outside diameter 104 of shank 82 and body 86. When the flutes (not shown) are ground down, a length of outer diameter 104 preferably is left extending downward from the cutting edge 96, 98 to form ear 106 and 108.

Figure 8:
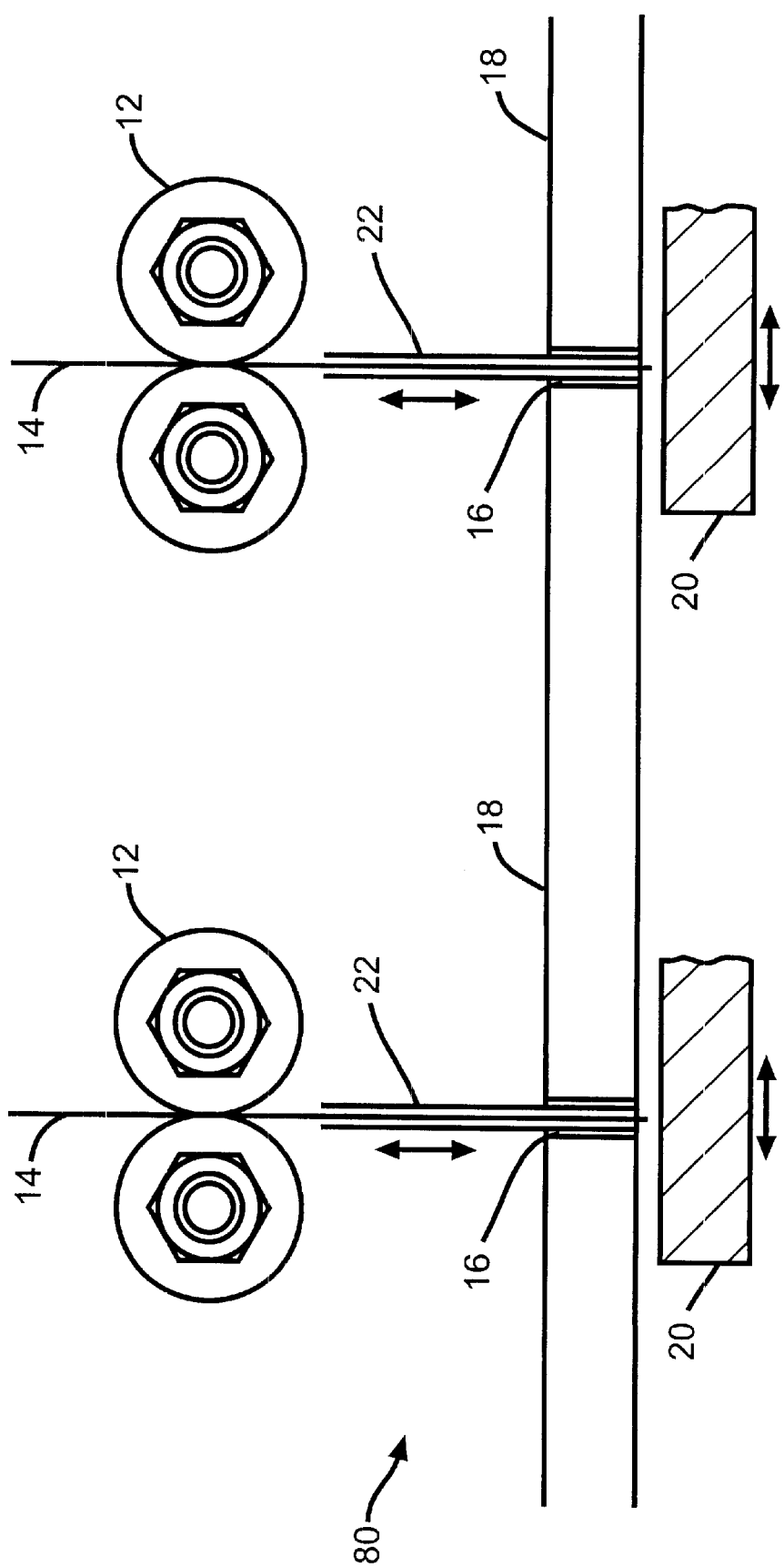
FIG. 8 shows the preferred plurality embodiment of this invention.

FIG. 8 shows the preferred plurality embodiment of this invention. FIG. 8 shows chopper 80 having a plurality of nip rollers 12 feeding continuous fibers 14 through apertures 16 of fixed head 18. A plurality of end mills 20 engage fibers 14 and chop them into discrete fiber lengths. Tubes 22 aid in feeding fibers 14 to apertures 16. Preferably, tubes 22 extends into apertures 16. End mills 20 have a movement In a horizontal or perpendicular direction with respect to fibers 14 as indicated by the arrows. Adjustable tubes 22 aid in the chopping process of fibers 14.

This unique chopper was designed for processing reinforcements having a specific coating thereon. Preferably, the mixture is an epoxy/polystyrene mixture developed for coating glass fiber reinforcements for thermoset resins such as polyesters. First, the glass is coated and dried. After drying, the roving then is wrapped around chilled mandrels and chopped into an appropriate length.

These after coated reinforcements are described in U.S. patent application Ser. No. 09/829,095, filed Apr. 9, 2001 and herein incorporated by reference.

In addition to these embodiments, persons skilled in the art can see that numerous modifications and changes may be made to the above invention without departing from the intended spirit and scope thereof.

I claim:

1. An apparatus for chopping continuous fibers into discrete fiber lengths comprising:
   at least one fixed head having a first side, a second side and at least one aperture therethrough;
   at least one means for feeding at least one continuous fiber through the at least one aperture from the first side; and
   at least one end mill on the second side of the at least one fixed head engaging the at least one continuous fiber.

2. An apparatus according to claim 1 wherein the fixed head has a circular shape.

3. An apparatus according to claim 1 wherein the aperture in the fixed head is a slot or circular hole.

4. An apparatus according to claim 1 wherein the means for feeding the continuous fiber is a pair of nip rollers.

5. An apparatus according to claim 4 including a tube between the nip rollers and the fixed head.

6. An apparatus according to claim 5 wherein the tube is capable of movement in a back and forth direction.

7. An apparatus according to claim 5 wherein the at lease one continuous fiber has a longitudinal axis and tube is capable of movement in a direction parallel to the longitudinal axis of the continuous fiber.

8. An apparatus according to claim 5 wherein the tube has an end that extends into the aperture of the fixed head.

9. An apparatus according to claim 5 wherein the tube is hollow and the continuous fiber passes through the hollow tube.

10. An apparatus according to claim 1 wherein the means for feeding the continuous fiber aligns the fiber transverse to the end mill.

11. An apparatus according to claim 1 wherein the end mill has a cutting end provided with flat cutting edges.

12. An apparatus according to claim 1 wherein the end mill has a ball nose cutting end provided with spiral grooves or flutes.

13. An apparatus according to claim 1 wherein the end mill has a cutting end provided with multiple cutting edges.

14. An apparatus according to claim 1 wherein the end mill is capable of movement in a back and forth direction.

15. An apparatus according to claim 1 wherein the at least one continuous fiber has a longitudinal axis and the end mill is capable of movement in a direction perpendicular to the longitudinal axis of the continuous fiber.

16. An apparatus for chopping continuous fibers into discrete fiber lengths comprising:
   a fixed head having a first side, a second side and a plurality of apertures therethrough;
   a plurality of means for feeding continuous fibers through the apertures from the first side; and
   a plurality of end mills on the second side of the fixed head engaging the continuous fibers.

17. A process for chopping continuous fibers into discrete fiber lengths comprising the steps of:
   providing at least one fixed head having a first side, a second side and at least one aperture therethrough;
   at least one continuous fiber through the at least one aperture from the first side; and
   rotating an end mill with a cutting end on the second side of the at least one fixed head wherein the cutting end of the end mill engages the at least one continuous fiber and chops the continuous fiber into discrete fiber lengths.

18. A process according to claim 17, including the step of moving the end mill in a back and forth direction.

19. A process according to claim 17 wherein the at least one continuous fiber has a longitudinal axis and including the step of moving the end mill in a direction perpendicular to the longitudinal axis of the continuous fiber.

20. A process according to claim 17 including the step of extending a tube into the aperture of the fixed head from the first side of the fixed head and including the step of passing the continuous fiber through the tube.

21. A process according to claim 20 including the step of moving the tube in a back and forth direction.

22. A process according to claim 20 wherein the at least one continuous fiber has a longitudinal axis and including the step of moving the tube in a direction parallel to the three longitudinal axis of the continuous fiber.

* * * * *